Oct. 4, 1966 D. R. TAYLOR, JR 3,277,383
AMPLITUDE LIMITING FREQUENCY MODULATION DETECTOR
Filed Sept. 7, 1962
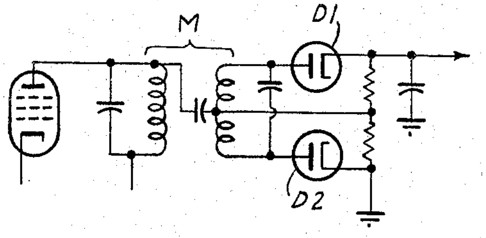
FIG. 1 (PRIOR ART)
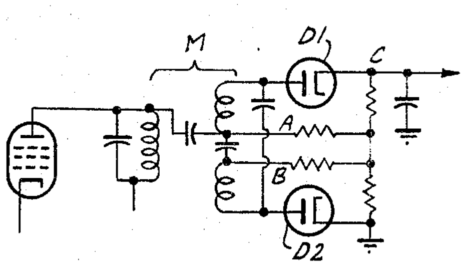
FIG. 2. (MODIFICATION OF FIG. 1.)
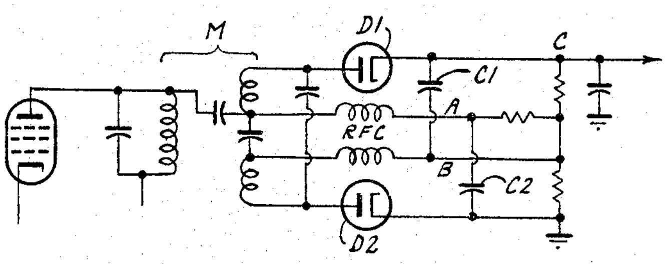
FIG. 3.
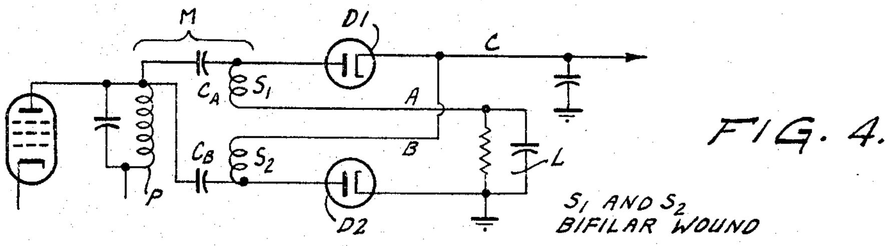
FIG. 4.
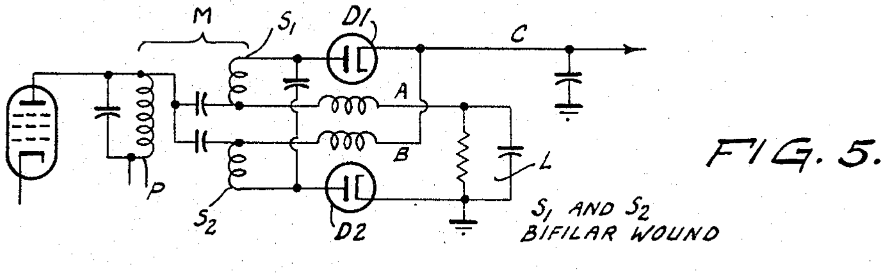
FIG. 5.
INVENTOR.
DONALD R. TAYLOR, JR.
BY
Fordyce A. Bothwell
ATTORNEY United States Patent Office 3,277,383
Patented Oct. 4, 1966

3,277,383
AMPLITUDE LIMITING FREQUENCY MODULATION DETECTOR

Donald R. Taylor, Jr., Philadelphia, Pa., assignor to Philco Corporation, Philadelphia, Pa., a corporation of Delaware Filed Sept. 7, 1962, Ser. No. 222,062
7 Claims. (Cl. 329—131)

This invention relates to the detecting and amplitude limiting operations which are required to be performed in the reception of frequency modulation signals, as in radio receivers and the like. As is well known, a frequency modulated carrier wave is subject to extraneous and undesirable amplitude variations in the course of transmission, and it is necessary not only to detect the frequency modulation representing the transmitted intelligence but also to eliminate or suppress the unwanted amplitude modulation so that it will not interfere with the detection process.

In some prior circuits the required operations are performed by a limiter-discriminator combination such as the well known dynamic limiter-discriminator combination. Such circuits require a separate limiting device, such as a diode, which adds appreciably to the cost of the circuit.

In other prior circuits the limiting function is performed without the need for a separate limiting device, but such circuits generally have other undesirable features. For example, in the well known ratio detector the dynamic limiting action occurs in the secondary of the discriminator transformer and this necessitates a high Q secondary which complicates the transformer design.

One object of the present invention is to provide an amplitude limiting frequency modulation detector which overcomes the disadvantages of prior circuits.

Another object of this invention is to provide a circuit wherein both amplitude limiting and frequency modulation detection are performed without the necessity of separate components or complicated design.

A further object of the invention is to provide a simple and inexpensive circuit which is highly efficient in the performance of the limiting and detecting functions.

Other objects and features of the invention will be apparent from the following detail description with reference to the accompanying drawing wherein;

FIGS. 1 and 2 are schematic diagrams which will facilitate an understanding of the invention and its evolution;

FIG. 3 is a schematic diagram of a circuit evolved in accordance with this invention;

FIG. 4 is a schematic diagram of a simple circuit according to this invention; and FIG. 5 is a schematic diagram of the circuit as it has been employed in practice.

Referring first to FIG. 1, the circuit there shown will be recognized as a conventional discriminator circuit which does not require description. Such a circuit is illustrated on page 586 of Radio Engineers' Handbook by Terman, 1st edition, published in 1943 by McGraw-Hill Book Co., Inc., and is described on pages 585 and 586 thereof. It suffices to note that the output voltage is the difference of the rectified outputs of the individual diodes D1 and D2. For convenience these rectified outputs may be designated as $E_{D1}$ and $E_{D2}$.

If this circuit is modified, as shown in FIG. 2, by splitting each diode load into two series resistors, the operation is not altered in any way except for a decrease in output determined by the relative sizes of the series resistors. Thus if all four resistors are equal, the output is decreased to one-half that of FIG. 1. The voltage from point C to ground is $\frac{1}{2}E_{D1}-\frac{1}{2}E_{D2}$, as is also the voltage between points B and A. The voltage from point A to ground is $\frac{1}{2}E_{D1}+\frac{1}{2}E_{D2}$, as is also the voltage between points B and C. If these latter voltages are maintained in variant with signal amplitude changes then the entire rectified output of each diode also remains constant and the above-mentioned difference voltages likewise remain constant.

Accordingly if, as shown in FIG. 3, large capacitors C1 and C2 are connected respectively between points B and C and between point A and ground (with suitable RF isolation), the difference output voltage appearing between point C and ground, and the corresponding difference voltage between points A and B, will be maintained invariant for all amplitude modulation frequencies for which the RC time constant is long.

The foregoing considerations led to the development of the circuit shown in FIG. 4 which is a modified and simplified version of the circuit of FIG. 3. In the circuit of FIG. 4 the individual secondary windings $S_1$ and $S_2$ are bifilar wound and are tuned by capacitors $C_A$ and $C_B$. The diodes D1 and D2 are connected as in the circuit of FIG. 3. However there is a direct connection between points B and C, and point A is connected to the RC load L. As may be clearly seen, the diodes are connected in series in a circuit which extends from the lower (grounded) end of the load L through diode $D_2$, winding $S_2$, diode $D_1$, winding $S_1$ and load L. The diodes are similarly poled in this series circuit, and the rectified D.C. current flows therein and produces a voltage across L which is derived at C by way of winding $S_1$ and diode $D_1$.

It has been found that in the operation of this circuit the diodes perform a dynamic limiting function on the primary P rather than on the secondary as in the case of the ratio detector. In this circuit the diodes are driven in phase opposition by the secondary instead of in series as in the ratio detector. The Q of the bifilar secondary is not important, as is the Q of the secondary of the ratio detector. This greatly simplifies the design of the transformer.

FIG. 5 shows another version of the same circuit, actual test of which has demonstrated its ability not only to perform frequency demodulation but also to suppress amplitude modulation. The circuit of FIG. 5 is similar to that of FIG. 4 but it includes RF chokes as in FIG. 3 and it also includes the tuning capacitor arrangement of FIGS. 1 to 3.

From the foregoing description it will be seen that this invention provides an amplitude limiting frequency modulation detector circuit which eliminates the need for a separate limiter as in the case of the dynamic limiter-discriminator combination and which also possesses advantages over the ratio detector.

While certain embodiments of the invention have been illustrated and described, it will be understood that the invention is not limited thereto but contemplates such modifications and further embodiments as may occur to those skilled in the art.

I claim:

1. In a frequency modulation detector, a transformer having a primary winding and first and second bifilar-wound individual secondary windings, said primary winding and said secondary windings being tuned to the same frequency, a first rectifier means connected to one end of said first secondary winding, a second rectifier means similarly connected to one end of said second secondary winding and to a point of fixed potential, an output connection extending from said first rectifier means, load impedance means connected between the other end of said first secondary winding and said point of fixed potential, and means connecting the other end of said second secondary winding to said first rectifier means and said output connection.

2. A frequency modulation detector according to claim 1, wherein said load impedance means comprises shunt-connected resistance and capacitance elements.

3. In a frequency modulation detector, a transformer having a primary winding and first and second bifilar-wound individual secondary windings, said primary and said secondary windings being tuned to the same frequency, capacitive means connected between said primary winding and said secondary windings, a first diode having one of its electrodes connected to one end of said first secondary winding, a second diode similarly having one of its electrodes connected to one end of said second secondary winding, an output connection extending from the other electrode of said first diode, load impedance means connected between the other end of said first secondary winding and a point of fixed potential, means connecting the other electrode of said second diode to said point of fixed potential, and means connecting the other end of said second secondary winding to said other electrode of said first diode and to said output connection.

4. A frequency modulation detector according to claim 3, wherein said load impedance means comprises shunt-connected resistance and capacitance elements.

5. In a frequency modulation detector, a transformer having a primary winding and first and second bifilar-wound individual secondary windings, said primary and said secondary windings being tuned to the same frequency, capacitive means connected between said primary winding and said secondary windings, a first diode having its anode connected to one end of said first secondary winding, a second diode similarly connected to one end of said second secondary winding, an output connection extending from the cathode of said first diode, load impedance means connected between the other end of said first secondary winding and a point of fixed potential, means connecting the cathode of said second diode to said point of fixed potential, and means connecting the other end of said second secondary winding to the cathode of said first diode and said output connection.

6. A frequency modulation detector circuit, comprising: a signal input transformer having a primary winding and first and second bifilar-wound individual secondary windings, said primary winding and said secondary windings being tuned to the same frequency; first and second rectifier means; a load impedance means; means connecting said first and second secondary windings, said first and second rectifier means and said load impedance means in series for direct current flow, said first and second rectifier means being similarly poled in the series current-flow path; and means for deriving as an output the voltage across said load impedance means.

7. A frequency modulation detector circuit, comprising: a signal input transformer having a primary winding and first and second bifilar-wound individual secondary windings; capacitive means connected between one end of said primary winding and corresponding ends of said secondary windings; first and second rectifier means; a load impedance means; means connecting said first and second secondary windings, said first and second rectifier means and said load impedance means in series for direct current flow, said first and second rectifier means being similarly poled in the series current-flow path; and means for deriving as an output the voltage across said load impedance means.

References Cited by the Examiner

UNITED STATES PATENTS

| | | | |
|---|---|---|---|
| 2,285,957 | 6/1942 | Wheeler | 329—133 |
| 2,420,230 | 5/1947 | Crosby | 329—132 |
| 2,932,800 | 4/1960 | Bereskin | 330—15 X |
| 3,102,984 | 9/1963 | Locanthi | 330—15 X |

ROY LAKE, *Primary Examiner.*

R. P. KANANEN, *Assistant Examiner.*